US008652689B2

(12) United States Patent
Yerramalli et al.

(10) Patent No.: US 8,652,689 B2
(45) Date of Patent: Feb. 18, 2014

(54) ENERGY STORAGE DEVICE AND SYSTEM (75) Inventors: Chandra Sekher Yerramalli, Niskayuna, NY (US); Anil Raj Duggal, Niskayuna, NY (US); Andrew Philip Shapiro, Schenectady, NY (US); Mohamed Rahmane, Ballston Lake, NY (US); Reza Sarrafi-Nour, Clifton Park, NY (US); Gregory John Parker, Latham, NY (US); Alireza Namazifard, Saratoga springs, NY (US); Badri Narayan Ramamurthi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 188 days.

(21) Appl. No.: 12/711,556

(22) Filed: Feb. 24, 2010

(65) Prior Publication Data
US 2011/0206980 A1    Aug. 25, 2011

(51) Int. Cl.
H01M 6/18 (2006.01)
H01M 2/02 (2006.01)

(52) U.S. Cl.
USPC ........................................... 429/304; 429/164

(58) Field of Classification Search
None
See application file for complete search history.

(56) References Cited

U.S. PATENT DOCUMENTS 4,132,820 A    1/1979  Mitoff
4,913,754 A    4/1990  Duncan et al.
5,112,703 A *  5/1992  Koenig ................. 429/103
5,279,908 A    1/1994  Bones et al.
5,536,594 A *  7/1996  Galloway et al. ......... 429/103

OTHER PUBLICATIONS

Linden, D. and Reddy, T.B., Handbook of Batteries, 3rd ed., McGraw-Hill, 2002, p. 40.3, 40.7.*
Beta Power Inc., "Conceptual Design Study of High-Performance Sodium/Metal Chloride Batteries for Electric Vehicle Applications", Final Technical Report, Contract No. DE-AC02-89CH10406, Jul. 1990, National Technical Information Service, Springfield VA.

* cited by examiner

Primary Examiner — Cynthia K. Walls
(74) Attorney, Agent, or Firm — Francis T. Coppa (57) ABSTRACT An energy storage device includes a housing having an interior surface defining a volume and a plurality of solid electrolyte elements disposed in the volume. Each solid electrolyte element has a first surface that defines at least a portion of a first, cathodic chamber, and a second surface that defines a second, anodic chamber. A plurality of individual anodic chambers are thus provided, at least one of which is evacuated below atmospheric pressure. A majority of anodic chambers can be spaced from one another in a manner that provides a substantially uniform reaction rate throughout the cathodic chamber. The housing and the plurality of solid electrolyte elements together may be configured to define a second volume devoid of solid electrolyte elements and that is sufficient in size to accommodate a desired number of solid electrolyte elements and to provide an accessible cathodic chamber filling point and that is further sufficient in size to alter the volume of the cathodic chamber with respect to the volume of the plurality of anodic chambers to achieve a desired volumetric ratio between the cathodic and anodic chambers.

20 Claims, 5 Drawing Sheets

ENERGY STORAGE DEVICE AND SYSTEM

BACKGROUND

The invention relates generally to energy storage devices and systems, and more particularly to electrical energy storage devices and systems that exhibit an operational life and power density suitable for use in providing cost-effective and reliable electric energy storage solutions for electrical power grid renewable firming applications.

The greatest potential for significantly reducing green house gas emissions and reducing the USA's petroleum consumption lies with the development and growth of renewable energy sources, such as wind and solar. To be optimally effective, a high penetration of these renewable energy sources into the electrical grid is necessary, as well as widespread electrification of the transportation systems. For either of these to occur, cost-effective and reliable electric energy storage solutions capable of delivering a wide range of power capabilities are needed.

When intermittent renewable power sources are connected to a power grid, other power sources on the grid need to modulate their output in order to make up for the intermittency and ensure stable power output. The modulation service provided by these other sources is referred to as frequency regulation or renewable firming. At present, renewable firming is accomplished through the adjustment of output from excess conventional coal or gas power-generating units. However, as the renewable reaction of the grid power increases, an alternative non-green house gas emitting solution is desired. In particular, a cost-effective energy storage technology is required that can produce and absorb energy at the minutes to hours time scale and that is scalable to the tens of megawatts power scale.

Desirably, a new energy storage technology would be provided that exhibits acceptable operational life so that the energy storage technology is suitable for use in renewable firming applications. The new energy storage technology will desirably provide a power density capability to provide an acceptable installed power cost. Any such technology will also desirably be scalable to the grid.

BRIEF DESCRIPTION

In one embodiment, an energy storage device includes a housing having an interior surface defining a volume; a plurality of solid electrolyte elements disposed in the volume, each solid electrolyte element having a first surface that defines at least a portion of a first, cathodic chamber, and a second surface that defines a second, anodic chamber so that a plurality of individual anode chambers are provided. Each anode chamber is in ionic communication with the cathode chamber through its corresponding solid electrolyte element. At least one anode chamber is evacuated to a pressure below atmospheric pressure.

According to another embodiment, an energy storage device comprises a housing having an interior surface defining a volume and a plurality of solid electrolyte elements disposed within the volume. Each solid electrolyte element has a first surface that defines at least a portion of a first chamber, and a second surface that defines a plurality of second chambers. A majority of the second chambers are spaced from one another at a distance that provides a substantially uniform reaction rate throughout the first chamber.

According to yet another embodiment, an energy storage device comprises a housing having an interior surface defining a volume and a plurality of solid electrolyte elements disposed within the volume. Each solid electrolyte element has a first surface that defines at least a portion of a first chamber, and a second surface that defines a plurality of second chambers. The volume is devoid of at least one solid electrolyte element to provide a space that is sufficient to provide a volume filling access point and to alter the volume of the first chamber with respect to the volume of the plurality of second chambers.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity).

Particular embodiments of the invention described herein are directed to an electrochemical cell or an energy storage device having a single cathode chamber in communication with a plurality of anode chambers through a plurality of solid electrolyte elements, wherein at least one anode chamber is evacuated to a pressure below atmospheric pressure. Other embodiments described herein are directed to methods of making and using an electrochemical cell or energy storage device and corresponding compositions.

Figure 1:
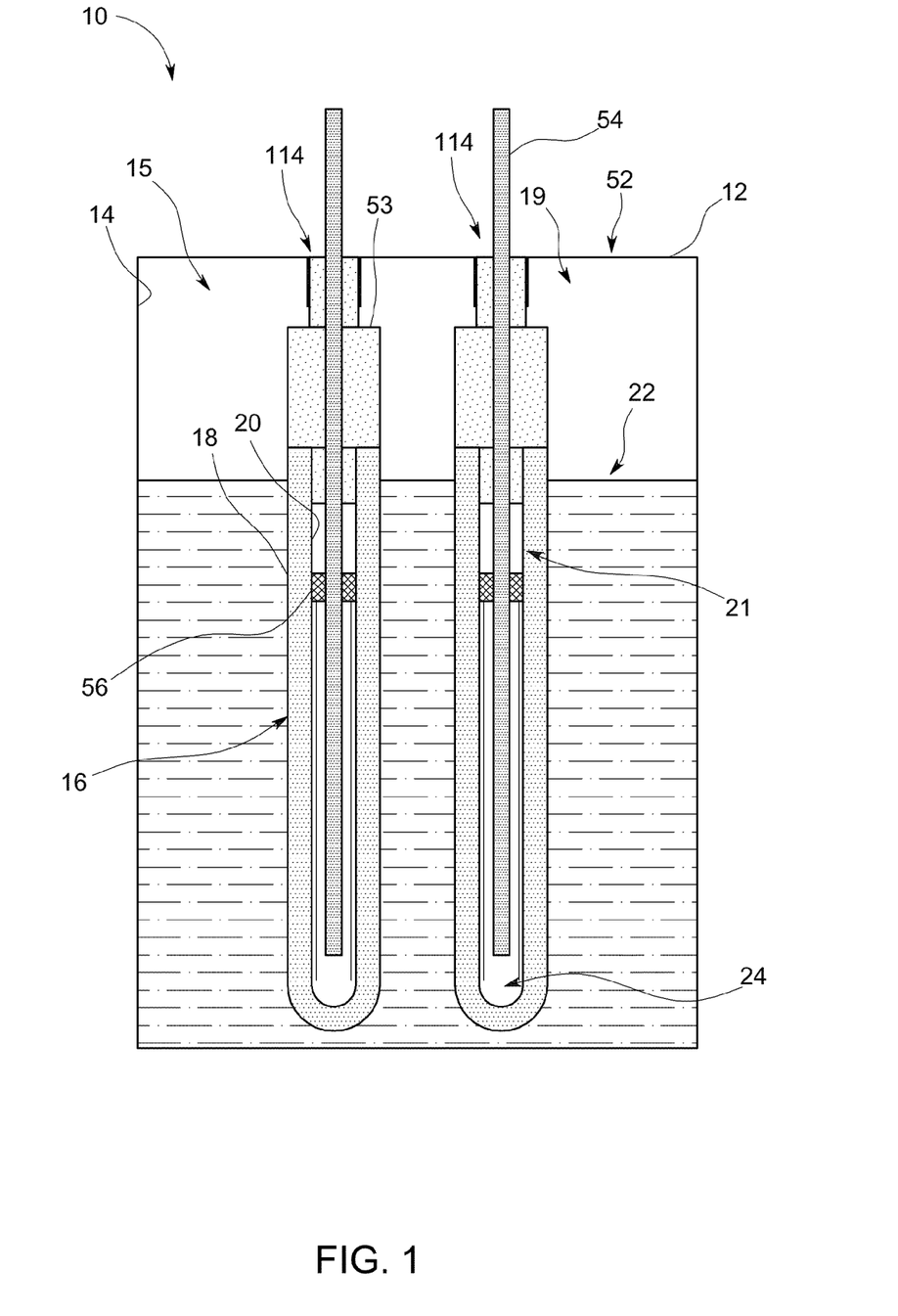
FIG. 1 is a cross sectional view of an energy storage device according to one embodiment of the invention.

FIG. 1 illustrates a cross sectional view of an energy storage device 10 according to one embodiment, including a housing 12 having an interior surface 14 defining a volume 15 and a plurality of solid electrolyte elements 16 disposed in the volume 15. Each solid electrolyte element 16, sometimes referred to as beta alumina solid electrolyte (BASE), has a first surface 18 that defines at least a portion of a first, cathode chamber 19, and a second surface 20 that defines a second, anode chamber 21 so that a plurality of anode chambers 21 are also provided. In some embodiments, at least two, or three, or four, or five, etc., anode chambers 21 are provided. At least a majority of, and in some embodiments, substantially all, of the anode chambers 21 are in ionic communication with the cathode chamber 19 through corresponding solid electrolyte elements 16.

At least one anode chamber 21 may be evacuated to a pressure below atmospheric pressure. This evacuation feature advantageously offsets any pressure that builds up within an anode chamber 21 when the anode chamber 21 is filled during first charge or further re-charge cycles with a desired anode material such as sodium and prevents mechanical failure of the anode chamber 21 due to overpressure that may be caused during the anode chamber 21 filling process. Due at least in part to the use of a common cathode chamber 19, external to the plurality of anode chambers 21, the embodied energy storage devices are expected to exhibit power densities of up to five times greater than conventional sodium-metal-halide energy storage devices or conventional sodium-sulfur energy storage devices.

Figure 2:
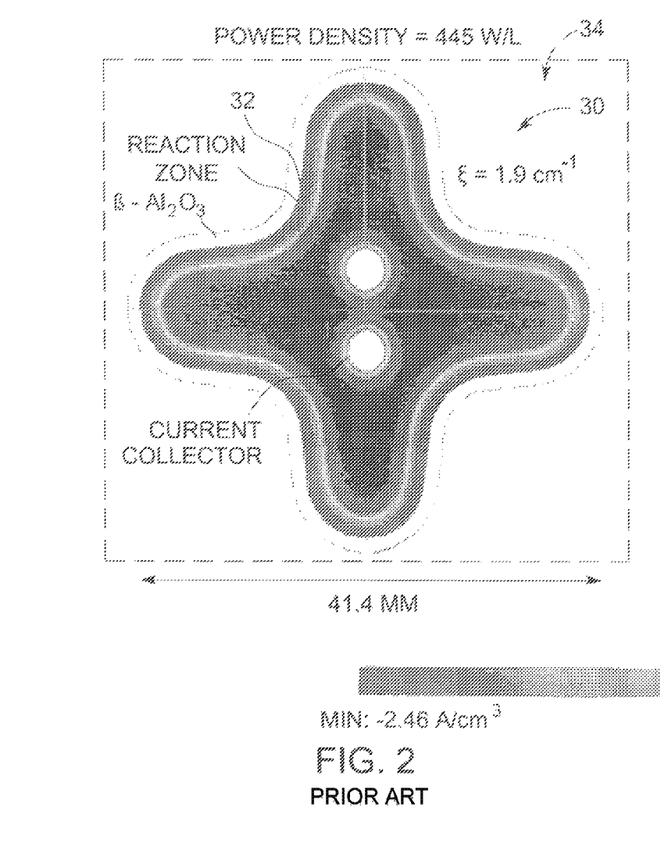
FIG. 2 is a representation of the calculated electrochemical reaction rate ($A/cm^3$) contours in a cathode under discharge conditions close to maximum power densities in a conventional sodium energy storage device comprising a cloverleaf solid electrolyte element.

More particularly, the ability of an energy storage device to deliver power is inversely proportional to its internal resistance. This internal resistance, in turn, is made up of ohmic and non-ohmic components. Ohmic resistance is largely dependent upon surface area of the solid electrolyte (BASE) 16, its thickness, and the thickness of the corresponding cathode. In current state of the art sodium devices, the solid electrolyte 16 has a cloverleaf cross section such as depicted in FIG. 2, with the unique characteristic of maintaining a higher surface area at the reaction front even as the electrode depleted zone moves further into the cathode region. At the same time, the cloverleaf geometry accommodates a shorter ionic transport distance at any state of charge compared to cylindrical cathodes of the same volume. The higher surface-area-to-volume-ratio of the cloverleaf design leads to higher power capability by about 35% relative to the cylindrical shape.

Nonetheless, cloverleaf cell 30 performance characteristics fall short for high power applications. This can be seen by studying the spatial extent of the electrochemical reaction rate under increasing current draw or power demand from the cell during the discharge process, as shown in the electrochemical reaction rate ($A/cm^3$) contours depicted in FIG. 2 and FIG. 3.

As shown in FIG. 2, in the conventional cloverleaf cell 30 under high power conditions, the reaction zone 32 is restricted to a small region of the cathode near the solid electrolyte surface. This is due to the fact that the ion transport length is small compared to the size of the cell 30. As a result only a small fraction of the cathode is utilized to provide the required current. This limits the power density that can be extracted from the cell 30.

Figure 3:
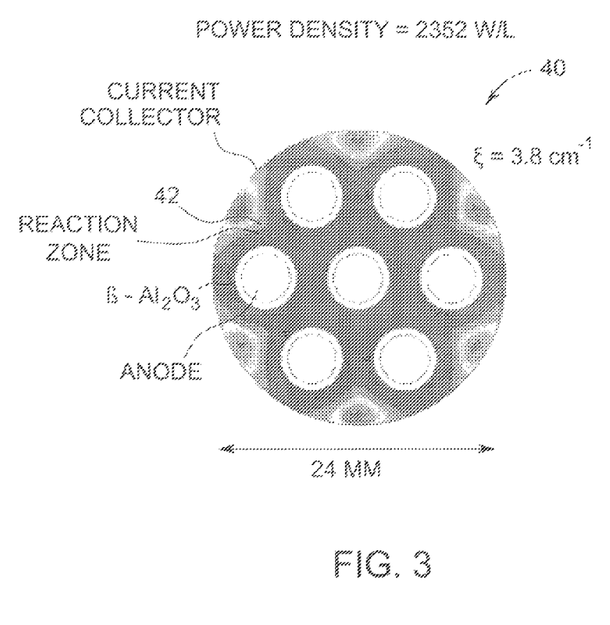
FIG. 3 is a representation of the calculated electrochemical reaction rate ($A/cm^3$) contours in a cathode under discharge conditions close to maximum power densities of an energy storage device according to one embodiment of the invention.

In contrast, the multi-anode, common cathode embodiments described herein, address this issue geometrically by ensuring a high solid electrolyte (BASE) surface area relative to the total cathode volume and at the same time by reducing the effective thickness of the cathode 22 shared by multiple anode chambers 21. A lower resistance is thus achieved due to both the increase of area between the cathode and the solid electrolyte (BASE), and the decrease of cathode thickness. As shown in FIG. 3, the multi-anode, common cathode architecture 40 provides a reaction zone 42 that utilizes a much greater proportion of the cathode at a given instant. This, in turn, provides a much higher re-charging and discharging power density capability.

Additionally, it has now been surprisingly discovered that, rather than a maximum distance that is desirable between the multiple chambers 21, it is more desirable to provide the multiple chambers 21 spaced apart from one another at a minimum distance that provides a substantially uniform reaction rate within the first, cathode chamber 19. Generally, the resistance of the cathode decreases as the thickness of the cathode is reduced. The present inventors however, surprisingly discovered that as the cathode thickness is reduced, the device chemistry and structure together causes the resistance of the cathode to actually increase when the thickness of the cathode has been reduced below a certain minimum thickness depending upon the device architecture and materials. The amount of power that can be extracted from the device 10 can then be optimized if the multiple chambers 21 are spaced apart from one another at the minimum distance since the entire cell 10 becomes active under this condition to provide a substantially uniform reaction rate within the cathode chamber 19.

Another limitation of the cloverleaf design is the thermal management of the cell 30. Under high current, combined joule heating and heat of reaction can lead to rapid and inhomogeneous temperature rise in the cell cathode since the heat dissipation takes place through a very resistive path through the solid electrolyte, the anode compartment and the housing. At a high state of discharge, the anode cavity 34 is largely devoid of sodium, further impeding heat flow to the housing. In contrast, with the multi-tube embodiments described herein, the heat conduction path to the housing 12 has lower resistance at all states of charge since the housing 12 is filled with cathodic material 22. As a result, heat dissipates efficiently and homogeneously.

Some energy storage device embodiments described herein comprise a common cathode, the chamber 19 of which being defined by a first surface 18 of each of a plurality of solid electrolyte elements 16 and a housing 12. This cathode chamber 19 may contain the cathodic material 22, which may be, for example, one or more of a first cathodic material, a second cathodic material, or a third cathodic material. The first cathodic material may exist in elemental form or as a salt depending on a state of charge. That is, the first cathodic material presents in elemental form and/or salt form and the ratio of the weight percent of the first cathodic material in elemental form to the weight percent of the salt form may be based on the state of charge.

Suitable materials for use as the first cathodic material may include aluminum, nickel, zinc, copper, chromium, antimony, arsenic, tungsten, molybdenum, and iron. In one embodiment, the first cathodic material consists essentially of only one of zinc, copper, chromium, nickel and iron. In one embodiment, the first cathodic material consists essentially of only two of nickel, zinc, copper, chromium, or iron. In one embodiment, the first cathodic material consists essentially of only three of aluminum, nickel, zinc, copper, chromium, antimony, arsenic, tungsten, molybdenum, and iron. The second cathodic material and the third cathodic material differ from the first cathodic material. The first cathodic material, second cathodic material, and the third cathodic material may be mixed with each other, may be adjacent to each other, or may be spatially and/or electrically removed from each other.

If present, the second cathodic material is different from the first cathodic material and may include aluminum, nickel, zinc, copper, chromium, and iron. Other suitable second cathodic materials may include antimony and/or arsenic. Other suitable second cathodic materials may include tungsten, titanium, niobium, molybdenum, tantalum, and vanadium. The first cathodic material may be present relative to the second metals by a ratio that is less than about 100:1. In one embodiment, the first cathodic material may be present relative to the additive metals by a ratio in that is in a range from about 100:1 to about 50:1, from about 50:1 to about 1:1, from about 1:1 to about 1:50, from about 1:50 to about 1:95.

A sulfur or a phosphorous containing additive may be disposed in the cathodic material. The presence of sulfur or phosphorous in the cathode prevents recrystallization of salts and grain growth. For example, elemental sulfur, sodium sulfide or other metal sulfides such as zinc sulfide, iron sulfide, molybdenum sulfide, and etc., may be disposed in the cathode.

The first cathodic material can be self-supporting or liquid/molten, but in one embodiment the cathodic material is disposed on a support structure. Alternatively, a second cathodic material that has a different activation voltage may support the cathodic material. The support structure may be a foam, a mesh, a weave, a felt, or a plurality of packed particles, fibers, whiskers. A suitable support structure may be formed from carbon. A suitable carbon foam is reticulated vitreous carbon.

The first cathodic material can be secured to an outer surface of the support structure. The support structure can have a high surface area. The first cathodic material on the support structure may be adjacent to the first surface of the solid electrolyte and extend away from that solid electrolyte surface. The support structure can extend away from the first surface to a thickness that is greater than about 0.01 millimeters. In some embodiments, the thickness is in a range of from about 0.01 millimeters to about 0.1 millimeter, from about 0.1 millimeters to about 1 millimeter, from about 1 millimeter to about 5 millimeters, from about 5 millimeters to about 10 millimeters, from about 10 millimeters to about 15 millimeters, or from about 15 millimeters to about 20 millimeters. For larger capacity electrochemical cells, the thickness may be larger than 20 millimeters.

By placing the first cathodic material on the support structure surface, rather than in the first chamber as a liquid melt, the homogeneity of the liquid can be avoided. That is, the placement on the support allows for the ability to locate specific materials within the electrochemical cell 10. For example, a concentration of the first cathodic material in elemental form may differ from a point nearer the solid electrolyte relative to a point further from the solid electrolyte. Like an onion, there can be layers of the first cathodic material being present in different concentrations or amounts depending on where located inside the electrochemical cell. Similarly, a gradient can be formed to address, for example, electrical resistivity rise or to provide a more constant availability of reactant as the reaction front area changes as it is used and advances into the cell body 12 away from the solid electrolyte surface 18. A gradient, as used herein, can include a concentration step change, and as such can be configured to function as a state of charge indicator.

Salts of the cathodic material 22 may be metal halides. Suitable halides may include chloride. Alternately, the halide may include bromide, iodide or fluoride. In one embodiment, the halide may include chloride, and one or more additional halides. Suitable additional halide may include iodide or fluoride. In one embodiment, the additional halides are sodium iodide or sodium fluoride. The amount of additional halide may be greater than about 0.1 weight percent. In one embodiment, the amount is in range of from about 0.1 weight percent to about 0.5 weight percent, from about 0.5 weight percent to about 1 weight percent, from about 1 weight percent to about 5 weight percent, from about 5 weight percent to about 10 weight percent.

In one embodiment, a liquid electrolyte may include salts of a first metal, a second metal and a third metal to form a ternary melt at an operating temperature that is sufficiently high to melt the salts. The ternary melt can be, for example $MCl_2:NaCl:AlCl_3$, where M represents the first metal. Suitable metals for use as the first metal "M" include transition metals.

Suitable ratios of $MCl_2$ to NaCl to $AlCl_3$ can have the $MCl_2$ content up to about 20 weight percent. The amount of the $AlCl_3$ present in the ternary melt may be in a range greater than about 10 weight percent based on the total weight. In one embodiment, the amount of $AlCl_3$ in the ternary melt is in a range of from about 10 weight percent to about 20 weight percent, from about 20 weight percent to about 30 weight percent, from about 30 weight percent to about 40 weight percent, from about 40 weight percent to about 50 weight percent, from about 50 weight percent to about 60 weight percent, or from about 60 weight percent to about 70 weight percent. In one embodiment, the amount of $AlCl_3$ is greater than an amount of NaCl based on weight. In another embodiment, the amount of NaCl is greater than an amount of $AlCl_3$ based on weight.

In one embodiment, the plurality of electrolyte salts includes a mixture of two metal salts to form a binary melt at the operating temperature. Suitable binary melts can include $NaCl:AlCl_3$, $MCl_2:NaCl$ or $MCl_2:AlCl_3$. In one embodiment, the binary melt consists essentially of $MCl_2:AlCl_3$. Suitable amount of the $MCl_2$ may be greater than 10 weight percent. In some embodiments, the amount of the $MCl_2$ ranges from about 10 weight percent to about 20 weight percent, from about 20 weight percent to about 30 weight percent, from about 30 weight percent to about 40 weight percent, from about 40 weight percent to about 50 weight percent, from about 50 weight percent to about 60 weight percent, from about 60 weight percent to about 70 weight percent, from about 70 weight percent to about 80 weight percent, or from about 80 weight percent to about 90 weight percent.

In one embodiment, the anode chamber 21 may contain one or more anodic materials that may function as an anode. A suitable material for the anodic material 24 supplying the transportion is a Group I metal, such as sodium. Other suitable anodic materials 24 may include one or both of lithium and potassium, and which may be used alternatively or additively with sodium. The anodic material 24 may be molten during use.

Additives suitable for use in the anodic material 24 may include a metal oxygen scavenger. Suitable metal oxygen scavengers may include one or more of manganese, vanadium, zirconium, aluminum, or titanium. Other useful additives may include materials that increase wetting of the solid electrolyte surface 20 by the molten anodic material 24. Additionally, some additives may enhance the contact or wetting of the solid electrolyte 16 with regard to the current collector, to ensure substantially uniform current flow throughout the solid electrolyte 16.

Suitable operating temperatures for the energy storage device 10 may be greater than about 150 degrees Celsius and may be selected based on components and performance requirements. In some embodiments, the operating temperature is in a range of from about 150 degrees Celsius to about 200 degrees Celsius, from about 200 degrees Celsius to about 250 degrees Celsius, from about 250 degrees Celsius to about 300 degrees Celsius, from about 300 degrees Celsius to about 350 degrees Celsius, from about 350 degrees Celsius to about 400 degrees Celsius, from about 400 degrees Celsius to about 450 degrees Celsius, from about 450 degrees Celsius to about 500 degrees Celsius, or from about 550 degrees Celsius to about 600 degrees Celsius.

The housing 12 can be sized and shaped to have a cross-sectional profile that is square, polygonal, or circular; and can have a width to length ratio that is greater than about 1:10. In some embodiments, the length to width ratio is in a range of from about 1:10 to about 1:5, from about 1:5 to about 1:1, from about 1:1 to about 5:1, from about 5:1 to about 10:1, or from about 10:1 to about 15:1. The housing 12 can be formed from a material that is a metal, ceramic, or a composite; the metal can be selected from nickel or steel, the ceramic can be a metal oxide.

At least one embodiment is directed to an electrochemical cell or an energy storage device 10 having a single cathode chamber 19 in communication with a plurality of anode chambers 21 through a plurality of solid electrolyte elements 16, wherein at least one anode chamber 21 is evacuated to a pressure below atmospheric pressure. There are also described herein, embodiments directed to methods of making and using the device 10 and corresponding compositions.

Optionally, one or more shim structures can be disposed inside the solid electrolyte element 16. The shim structures may provide a thin gap adjacent to the solid electrolyte 16 to facilitate wicking of a thin layer of molten anodic material 24 against an internal surface 20 of the solid electrolyte 16. This wicking may be independent of the state of charge of the battery, and independent of the head height of anodic material 24.

As noted above, the solid electrolyte 16 is disposed within the volume 15 of the housing 12. The solid electrolyte 16 according to some embodiments may have a cross-sectional profile normal to the axis that is a circle, a triangle, a square, a cross, or a star. Alternatively, the solid electrolyte 16 can have a high aspect ratio rectangular cross section that is substantially planar. A planar configuration (or with a slight dome) may be useful in a prismatic or button-type battery configuration, where the solid electrolyte 16 is domed or dimpled. Similarly, the solid electrolyte 16 can be flat or undulate.

The solid electrolyte 16 may be an alkali metal ion conductor solid electrolyte that conducts alkali metal ions during use. Suitable materials for the solid electrolyte 16 may include an alkali-metal-beta'-alumina, alkali-metal-beta"-alumina, alkali-metal-beta'-gallate, or alkali-metal-beta"-gallate. In one embodiment, the solid electrolyte 16 includes a beta alumina. In one embodiment, a portion of the solid electrolyte 16 is an ionic and electronic insulator material such as alpha alumina and another portion of the solid electrolyte 16 is beta alumina. The alpha alumina may be relatively more amenable to bonding (e.g., compression bonding) than beta alumina, and may help with sealing and/or fabrication of the energy storage device 10.

The solid electrolyte 16 may be stabilized by the addition of small amounts of, but not limited to lithia, magnesia, zinc oxide, yttria or similar oxides. These stabilizers may be used alone or in combination with themselves or with other materials. The solid electrolyte 16, sometimes referred to as beta alumina solid electrolyte (BASE) may include one or more dopants. Suitable dopants may include oxide of a transition metal selected from iron, nickel, copper, chromium, manganese, cobalt, or molybdenum. A solid electrolyte 16 having the dopants is referred to as beta alumina solid electrolyte, and has higher sodium ion conductivity than beta alumina. Sodium ion conductivity of one form of beta" alumina solid electrolyte at 300 degrees Celsius is in a range of from about 0.2 ohm$^{-1}$ cm$^{-1}$ to about 0.4 ohm$^{-1}$ cm$^{-1}$.

The amount of the stabilizer to the beta" alumina can be greater than 0.5 weight percent. In some embodiments, the amount is in a range of from about 0.5 weight percent to about 1 weight percent, from about 1 weight percent to about 2 weight percent, from about 2 weight percent to about 3 weight percent, from about 3 weight percent to about 4 weight percent, from about 4 weight percent to about 5 weight percent, from about 5 weight percent to about 10 weight percent, from about 10 weight percent to about 15 weight percent, from about 15 weight percent to about 20 weight percent, or greater than about 20 weight percent based on the total weight of the beta" alumina material.

The solid electrolyte (BASE) 16 can be a tubular container in one embodiment having at least one wall. The wall can have a thickness; and an ionic conductivity and the resistance across the wall may depend in part on the thickness. Suitable thickness can be less than 5 millimeters. In some embodiments, the thickness is in a range of from about 5 millimeters to about 4 millimeters, from about 4 millimeters to about 3 millimeters, from about 3 millimeters to about 2 millimeters, from about 2 millimeters to about 1.5 millimeters, from about 1.5 millimeters to about 1.25 millimeters, from about 1.25 millimeters to about 1.1 millimeters, from about 1.1 millimeters to about 1 millimeter, from about 1 millimeter to about 0.75 millimeters, from about 0.75 millimeters to about 0.6 millimeters, from about 0.6 millimeters to about 0.5 millimeters, from about 0.5 millimeters to about 0.4 millimeters, from about 0.4 millimeters to about 0.3 millimeters, or less than about 0.3 millimeters.

A cation facilitator material can be disposed on at least one surface of the solid electrolyte 16, in one embodiment. The cation facilitator material may include, for example, selenium. At least one solid electrolyte surface has a surface roughness RMS in a range of greater than about 10 nanometers. In some embodiments, the surface roughness (RMS) is in range of from about 10 nanometers to about 20 nanometers, from about 20 nanometers to about 30 nanometers, from about 30 nanometers to about 40 nanometers, from about 40 nanometers to about 50 nanometers, from about 50 nanometers to about 60 nanometers, from about 60 nanometers to about 70 nanometers, from about 70 nanometers to about 80 nanometers, from about 80 nanometers to about 90 nanometers, or from about 90 nanometers to about 100 nanometers.

The solid electrolyte 16 can seal to an inner surface 14 of the housing 12 by a sealing structure. The sealing structure can be of a glass composition. The sealing structure is operable to maintain a seal between the contents and the environment at a temperature greater than about 100 degrees Celsius. In some embodiments, the operating temperature range is from about 100 degrees Celsius to about 200 degrees Celsius, from about 200 degrees Celsius to about 300 degrees Celsius, from about 300 degrees Celsius to 400 degrees Celsius, from about 400 degrees Celsius to about 500 degrees Celsius, or from about 500 degrees Celsius to about 600 degrees Celsius.

Suitable seal glass compositions may include, but are not limited to phosphates, silicates, borates, germinates, vanadates, zirconates, arsenates, and their various forms, for example, borosilicates, alumino silicate, calcium silicate, binary alkali silicates, alkali borates, or a combination of two or more thereof. Alternatively, the end portions of the solid electrolyte may include alpha alumina. The alpha alumina can be bonded directly to the lid that encloses the cathode chamber 19. Suitable bonding methods may include thermal compression bonding, diffusion bonding, reaction bonding or thin film metallizing, each of these may be used in conjunction with welding or brazing techniques.

The solid electrolyte 16 can be formed as a toughened ceramic, and can be formed with various modifiers that affect physical strength, vibration/shock resistance, ionic conductivity/resistance, and copper ion infiltration. To reduce a pressure differential across the solid electrolyte, a lowered pressure generally caused on the cathode side by the change in the liquid electrolyte volume fraction during the re-charge/discharge reactions may be balanced by reducing the initial pressure on the anode side to less than ambient. The anode side may be sealed under vacuum, or a low pressure may be formed after sealing when the anode chamber 21 is sealed under some nominal pressure of an atmosphere of a gas at an elevated temperature and brought down to a lower temperature. Alternatively, a lower pressure on the anode side could be achieved by deploying a gettering material that reacts with the residual atmosphere (e.g. Oxygen, Nitrogen, and etc) to produce condensed reaction product species inside the anode chamber 21.

The energy storage device 10 may have a plurality of current collectors including anode current collectors 54 and cathode current collectors 52. Each anode current collector 54 is in electrical communication with a corresponding anode chamber 21 and the cathode current collector 52 is in electrical communication with the contents of the cathode chamber 19. The current collectors may include an electrically conductive material. Suitable materials for the anode current collector 54 may include W, Ti, Ni, Cu, Mo, Fe, steel or combinations of two or more thereof. Other suitable materials for the anode current collector 54 may include carbon. The cathode current collector 52 may be a wire, paddle or mesh formed from Pt, Pd, Au, Mo, Cr, Ni, Cu, C, Fe or Ti. Alternatively, the cathode current collector 52 may be at least a portion of the device housing 12 that may comprise steel. The cathode current collectors may be plated or clad.

The plurality of cathode current collectors can have thickness greater than 1 millimeter (mm). In some embodiments, the thickness is in a range of from about 1 millimeter to about 10 millimeters, from about 10 millimeters to about 20 millimeters, from about 20 millimeters to about 30 millimeters, from about 30 millimeters to about 40 millimeters, or from about 40 millimeters to about to about 50 millimeters. Cladding on the cathode current collector(s), if present, may coat the current collector to a thickness greater than about 1 μm. In some embodiments, the cladding thickness is in a range of from about 1 micrometer (μm) to about 10 μm, from about 10 μm to about 20 μm, from about 20 μm to about 30 μm, from about 30 μm to about 40 μm, or from about 40 μm to about to about 50 μm.

The device 10 may be assembled in the discharged state. Applying a voltage between one or more of the anodes and the cathode of the electrochemical cell may charge the device 10. In one embodiment, sodium chloride in the cathode dissolves to form sodium ions and chloride ions during recharge. Sodium ions, under the influence of applied electrical potential, conduct through the solid electrolyte 16 and combine with electrons from the external circuit to form the sodium electrode and chloride ions react with the cathodic material to form metal chloride and donate electrons back to external circuit. During discharge, sodium ions conduct back through the solid electrolyte 16 reversing the reaction, and generating electrons. The device reaction is as follows:

$$n\text{NaCl} + M \longleftrightarrow \text{MCl}_n + n\text{Na}^+ + ne^-$$

A plurality of the energy storage devices 10 can be organized into an energy storage system. Multiple devices can be connected in series or parallel. For convenience, a group of coupled devices may be referred to as a module or pack. The ratings for the power and energy of the module may depend on such factors as the number of devices in the module. Other factors may be based on end-use application specific criteria.

Various embodiments of the energy storage system can store an amount of energy that is in a range of from about 0.1 kilowatt hours (kWh) to about 100 kWh. One embodiment of the energy storage system has an energy-by-weight ratio of greater than 100 Watt-hours/kilogram to about 200 Watt-hours/kilogram, and/or an energy-by-volume ratio of greater than 160 Watt-hours/liter to about 400 Watt-hours/liter. Another embodiment of the energy storage system has a specific power rating of greater than 150 Watts/kilogram to about 1000 Watts/kilogram.

Suitable energy storage systems may have an application specific Power to Energy ratio of less than 10 to 1 hour$^{-1}$. In some embodiments, the specific power to energy ratio is in range from about 1:1 to about 2:1, from about 2:1 to about 4:1, from about 4:1 to about 6:1, from about 6:1 to about 8:1, or from about 8:1 to about 10:1. In other embodiments, the power to energy ratio is in range from about 1:1 to about 1:2, from about 1:2 to about 1:4, from about 1:4 to about 1:6, from about 1:6 to about 1:8, or from about 1:8 to about 1:10.

In one embodiment of the energy storage system, a controller communicates with the plurality of the devices 10. The controller can distribute an electrical load to select cells in a cell module in response to feedback signals indicating states for each of the cells in the cell module. The controller can perform a re-warm method in which a series of heating elements are activated in a sequence to melt a frozen portion of the energy storage device in a determined manner. In another embodiment, the controller may distribute an electrical load to select cathodic materials at determined locations within individual cells.

If present, a heat management device maintains the temperature of the energy storage system. The heat management device can warm the energy storage system if too cold, and can cool the energy storage system if too warm. The heat management system includes a thaw profile that can maintain a minimal heat level in the anode and cathode chambers to avoid a freeze of cell reagents.

Another embodiment of the invention provides an energy management system that includes a second energy storage device that differs from the energy storage device provided. This duel energy storage device system can address the ratio of power to energy in that a first energy storage device can be optimized for power delivery, and a second energy storage device can be optimized for efficient energy storage. The control system can draw from either energy storage device as needed, and charge back either energy storage device that needs such a charge.

Suitable second energy storage devices, for the efficient energy storage, include a secondary battery, a fuel cell, or an ultracapacitor. A suitable secondary battery may be a lithium battery, lithium ion battery, lithium polymer battery, sodium battery or a nickel metal hydride battery.

Figure 4:
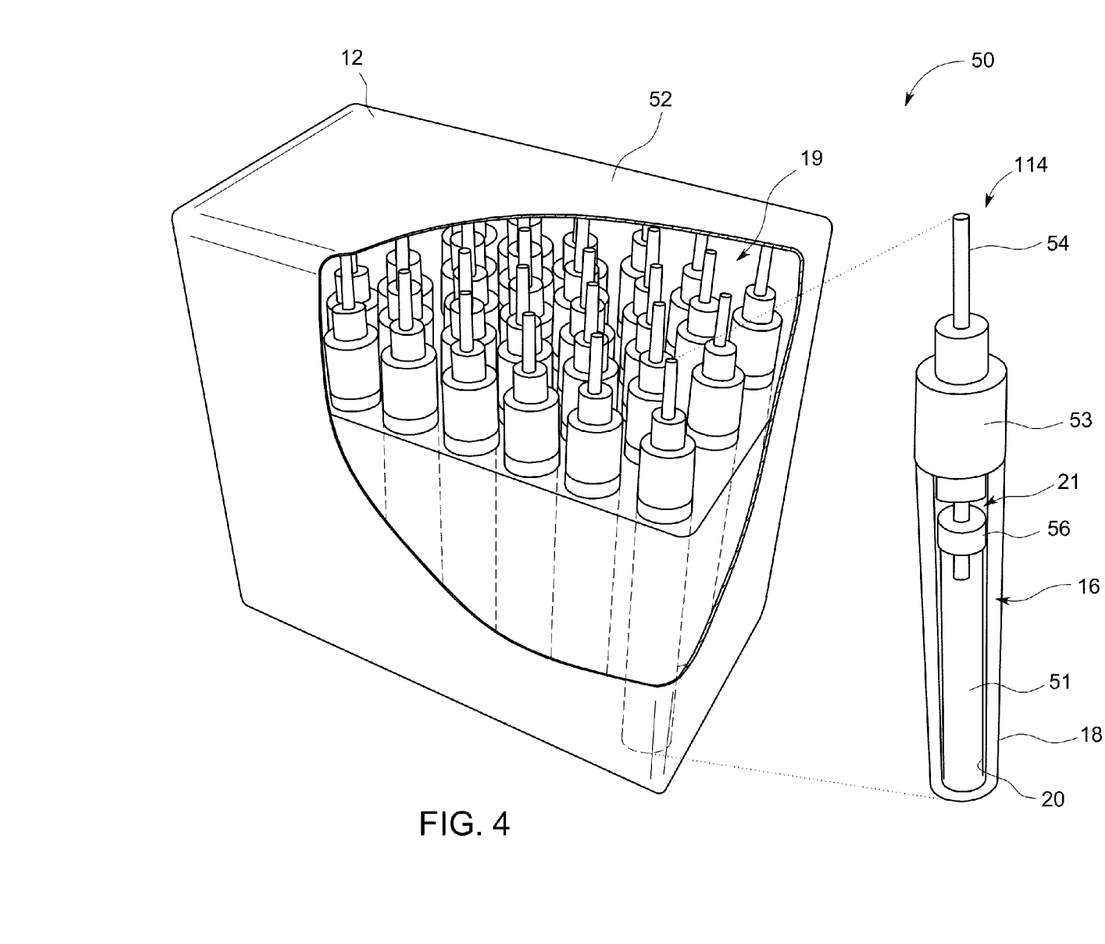
FIG. 4 illustrates an energy storage device in accordance with one embodiment of the invention.

An energy storage device 50 in accordance with another embodiment is shown in FIG. 4. The device 50 may be used as an electrochemical cell for producing energy. Device 50 includes a housing 12. The housing 12 includes a plurality of solid electrolyte (BASE) elements 16 having an outer surface 18 and an inner surface 20. The outer surface 18, in combination with housing 12, defines a first, cathodic chamber 19 and the inner surface 20 defines a second, anodic chamber 21. The first chamber 19 forms a cathode including a plurality of salts and the second chamber 21 forms an anode including sodium. The first chamber 19 is in ionic communication with the second chamber 21 through the solid electrolyte element 16. The first chamber 19 and the second chamber 21 further include a cathode current collector 52 and an anode current collector 54 to collect the current produced by the electrochemical cell 50.

According to one aspect, housing 12 is devoid of at least one solid electrolyte element 16 to provide a space that is sufficient to provide a first, cathodic chamber 19 filling access point and to alter the volume of the cathode with respect to the volume of the anode.

Figure 5:
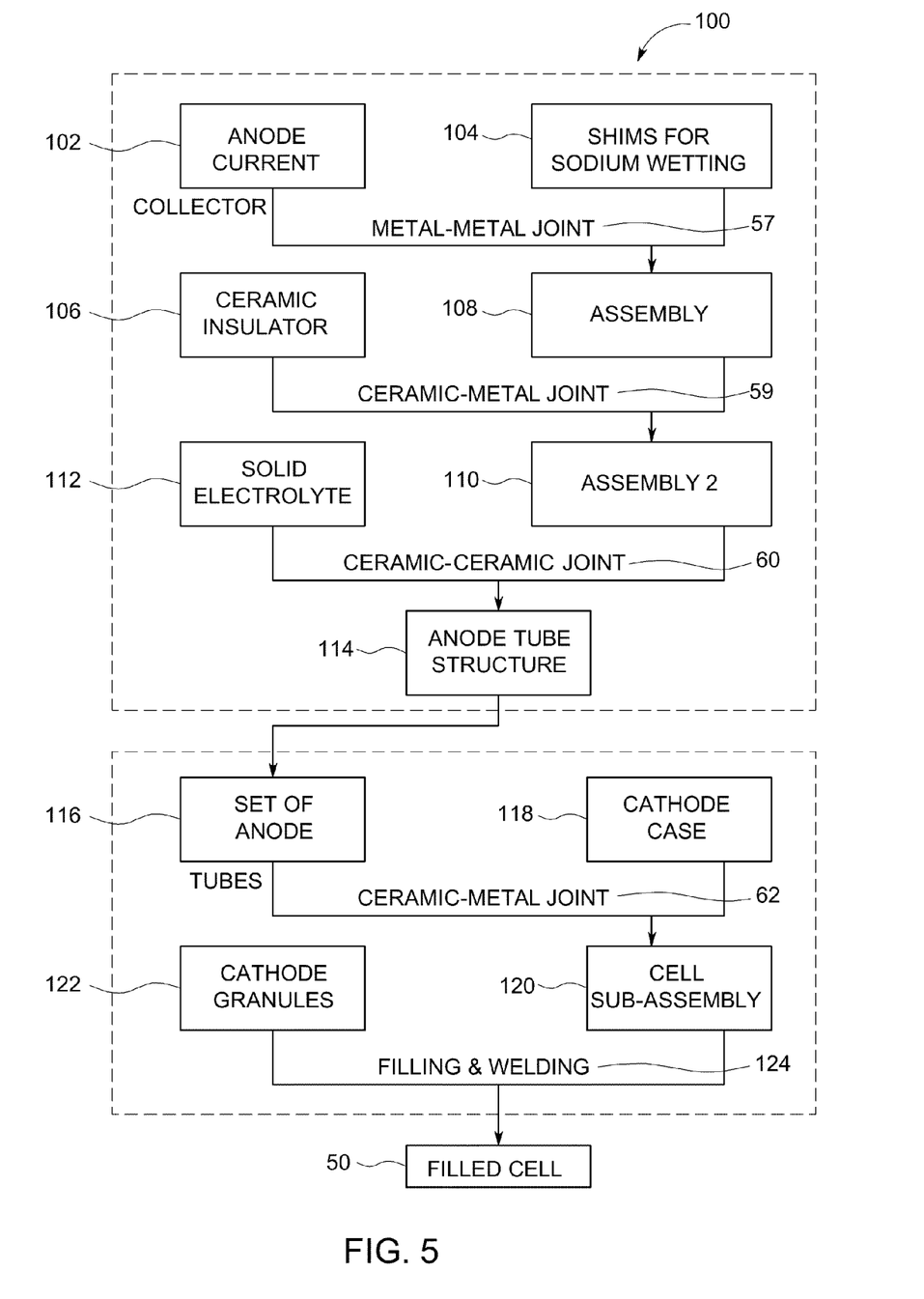
FIG. 5 is a process diagram showing a method for assembling an energy storage device according to one embodiment of the invention.
Figure 6:
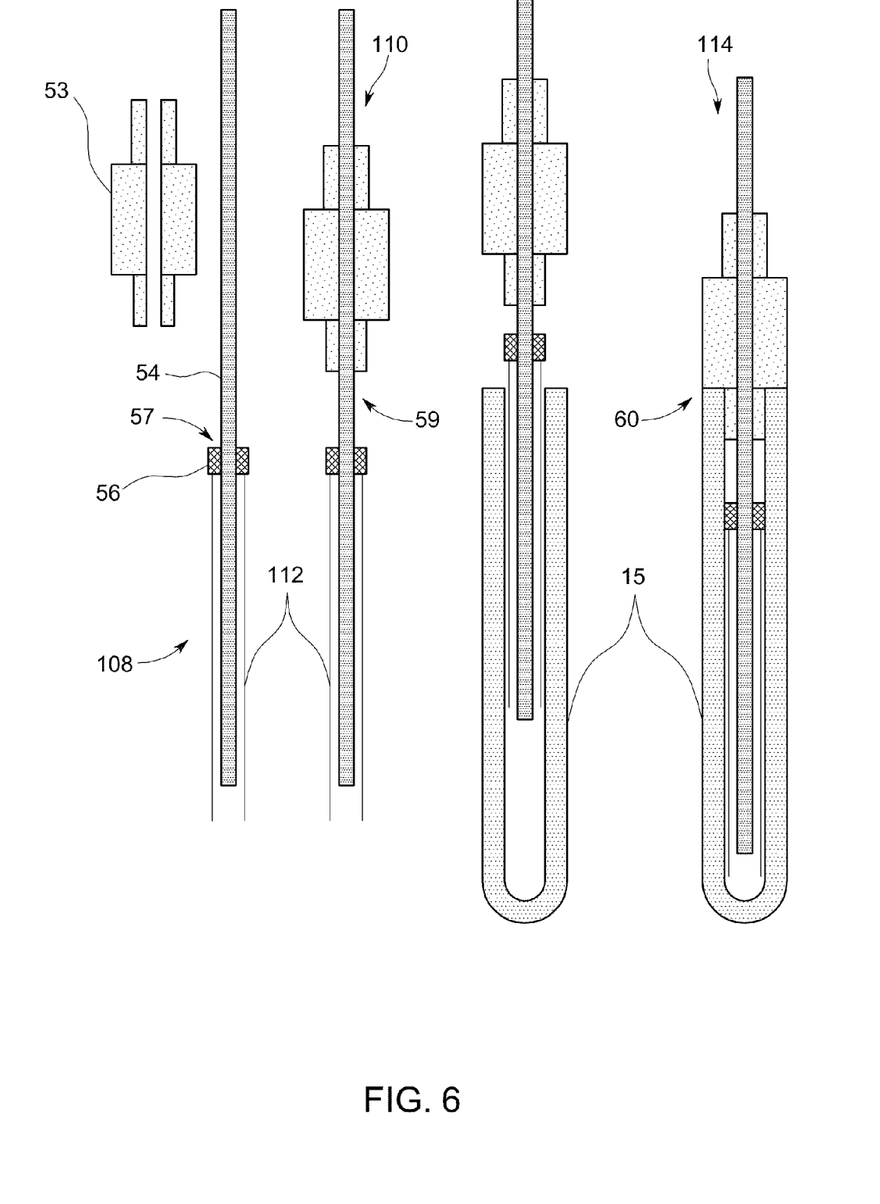
FIG. 6 illustrates in further detail an anode structure formed during the process depicted in FIG. 5.

FIG. 5 is a process diagram 100 illustrating assembly of an energy storage device 50 according to one embodiment of the invention. The energy storage device 50 comprises a plurality of anode tube assemblies 114 such as that depicted in greater detail in FIG. 6, and can be seen to include a ceramic insulator 53, an anode current collector 54, a wick system that includes a shim 56 for sodium wetting, and a solid electrolyte element 16. The anode current collector 54 is first attached via a metal-metal joint 57 to a shim assembly containing at least one shim 112 supported by a collar 56 as represented in blocks 102 and 104. The resultant collector-shim assembly 108 is then attached to the ceramic insulator 53 via a ceramic-metal joint 59 as represented in blocks 106 and 108. The resultant feed-through current collector assembly 110 is next inserted into a tubular solid electrolyte element 16 and sealed therein via a ceramic-ceramic joint 60 to form the anode tube structure as represented in blocks 110, 112 and 114. FIG. 6 illustrates the metal-metal joint 57, the ceramic-metal joint 59, and the ceramic-ceramic joint 60 locations with respect to the completed anode tube structure 114.

A plurality of anode tube structures (anode tube assemblies) 114 are inserted into and attached to a predetermined cathode case 12 via a ceramic-metal joint 62 as represented in blocks 116 and 118 to form a cell sub-assembly 120. The resultant cell sub-assembly 120 is then filled with a desired amount of cathode materials as represented in block 122 that is then sealed via a predetermined welding process 124 to form a completed energy cell such as depicted in FIG. 6 that illustrates the completed energy cell 50.

While only certain features and embodiments have been illustrated and described herein, many modifications and changes may occur to one of ordinary skill in the relevant art. Thus, it is intended that the scope of the invention disclosed should not be limited by the particular disclosed embodiments described above, but should be determined only by a fair reading of the claims that follow.

What is claimed is:

1. An energy storage device comprising:
    a housing having an interior surface defining a volume; and
    a plurality of solid electrolyte elements disposed within the volume, each solid electrolyte element having a first surface that defines at least a portion of a first, cathode chamber comprising a cathode material defining a cathode disposed therein, and a second surface, such that the plurality of solid electrolyte elements defines a plurality of second, anodic chambers;
    wherein a majority of the anodic chambers are in ionic communication with a single, common cathode, and further wherein the anodic chambers are spaced apart from one another at a distance equal to a thickness of the cathode such that any deviation in the thickness of the cathode increases cathode resistance.

2. The energy storage device according to claim 1, wherein the housing and the anodic chambers have a substantially similar configuration.

3. The energy storage device according to claim 1, wherein the housing and the anodic chambers have a substantially different configuration.

4. The energy storage device according to claim 1, wherein each anodic chamber has a generally circular configuration.

5. The energy storage device according to claim 1, wherein each anodic chamber has a generally triangular configuration.

6. The energy storage device according to claim 1, wherein each anodic chamber has a generally hexagonal configuration.

7. The energy storage device of claim 1, wherein substantially all of the anodic chambers are configured so as to be capable of being evacuated to a pressure below atmospheric pressure.

8. The energy storage device of claim 1, wherein each anodic chamber comprises a beta alumina secondary electrolyte.

9. The energy storage device of claim 8, wherein the beta alumina material is alkali-metal-beta"-alumina.

10. The energy storage device of claim 1, comprising a sodium-metal chloride battery, wherein a negative electrode of the battery comprises molten sodium; and a positive electrode comprises nickel.

11. The energy storage device according to claim 1, wherein the housing and the plurality of solid electrolyte elements together are configured to define a second volume devoid of solid electrolyte elements, and that is sufficient in size to accommodate a desired number of solid electrolyte elements, and to provide an accessible cathode chamber filling point, and that is further sufficient in size to alter the volume of the cathode chamber with respect to the volume of the plurality of anodic chambers, to achieve a desired volumetric ratio between the cathode and anodic chambers.

12. The energy storage device of claim 1, wherein all of the anodic chambers are in ionic communication with the common cathode.

13. The energy storage device of claim 1, wherein the anodic chambers are spaced apart from each other at a minimum distance that provides a substantially uniform electrochemical reaction rate within the first cathode chamber, wherein the minimum distance is equal to the thickness of the cathode such that any deviation in the thickness of the cathode increases cathode resistance.

14. The energy storage device of claim 1, wherein the cathode material is disposed on a support structure.

15. The energy storage device of claim 14, wherein the support structure comprises carbon.

16. The energy storage device of claim 15, wherein the support structure is formed of reticulated, vitreous carbon foam.

17. The energy storage device of claim 14, wherein the cathode material is secured to an outer surface of the support structure, adjacent to a first surface of the solid electrolyte, and extending away from the electrolyte surface to a thickness of greater than about 0.01 mm.

18. The energy storage device of claim 17, wherein the cathode material extends away from the electrolyte surface to a thickness that is in the range from about 5 mm to about 20 mm.

19. The energy storage device of claim 17, wherein the cathode material extends away from the electrolyte surface to a thickness that is greater than 20 mm.

20. The energy storage device of claim 1, comprising a plurality of cathode current collectors, each having a thickness greater than 1 mm.

\* \* \* \* \*